(12) United States Patent
Boulton

(10) Patent No.: US 9,451,484 B2
(45) Date of Patent: Sep. 20, 2016

(54) WIFI POSITIONING BENCH TEST METHOD AND INSTRUMENT

(71) Applicant: Spirent Communications, Inc., Sunnyvale, CA (US)

(72) Inventor: Peter George Boulton, Paignton (GB)

(73) Assignee: SPIRENT COMMUNICATIONS, INC., Sunnyvale, CA (US)

( * ) Notice: Subject to any disclaimer, the term of this patent is extended or adjusted under 35 U.S.C. 154(b) by 71 days.

(21) Appl. No.: 14/598,106

(22) Filed: Jan. 15, 2015

(65) Prior Publication Data

US 2015/0131470 A1 May 14, 2015

Related U.S. Application Data

(63) Continuation of application No. 12/976,756, filed on Dec. 22, 2010, now Pat. No. 8,938,201.

(60) Provisional application No. 61/325,150, filed on Apr. 16, 2010.

(51) Int. Cl.

| H04W 24/06 | (2009.01) |
|---|---|
| G01S 5/02 | (2010.01) |
| G01S 19/23 | (2010.01) |
| H04L 12/26 | (2006.01) |
| H04L 12/24 | (2006.01) |
| H04W 24/08 | (2009.01) |
| H04W 36/08 | (2009.01) |
| H04W 64/00 | (2009.01) |
| H04W 84/12 | (2009.01) |

(52) U.S. Cl.
CPC ............ *H04W 24/06* (2013.01); *G01S 5/0221* (2013.01); *G01S 19/23* (2013.01); *H04L 12/2697* (2013.01); *H04L 41/22* (2013.01); *H04L 43/50* (2013.01); *H04W 24/08* (2013.01); *H04W 36/08* (2013.01); *H04W 64/00* (2013.01); *H04W 84/12* (2013.01)

(58) Field of Classification Search
None
See application file for complete search history.

(56) References Cited

U.S. PATENT DOCUMENTS

| 5,761,486 A | 6/1998 | Watanabe et al. |
|---|---|---|
| 6,208,841 B1 | 3/2001 | Wallace et al. |
| 6,560,459 B1 | 5/2003 | Wong |

(Continued)

FOREIGN PATENT DOCUMENTS

WO    2010093999 A2    8/2010

OTHER PUBLICATIONS

Geohash, Wikipedia—Geohash 2008 public domain, 5 pgs, accessed Dec. 22, 2010, http://en.wikipedia.org/wiki/Geohash.

(Continued)

*Primary Examiner* — Anh Ngoc Nguyen
(74) *Attorney, Agent, or Firm* — Haynes Beffel & Wolfeld LLP; Ernest J. Beffel, Jr.

(57) ABSTRACT

The present invention relates to simulation on a lab workbench of conditions that would be encountered by a mobile device during a so-called drive test, which involves transporting the mobile device along a course so that it encounters fading and changing wireless access points used normally to connect the mobile device to a wireless network but in this case used to locate the device. The instrument and method also support parametric testing of transceivers used for WiFi positioning and, optionally, GNSS positioning by the same mobile device used for WiFi positioning.

21 Claims, 11 Drawing Sheets

(56) References Cited

U.S. PATENT DOCUMENTS

| | | | |
|---|---|---|---|
| 6,571,082 B1 | 5/2003 | Rahman et al. | |
| 6,636,721 B2 | 10/2003 | Threadgill et al. | |
| 7,224,941 B2 | 5/2007 | Liu | |
| 7,324,588 B2 | 1/2008 | Green et al. | |
| 7,349,670 B2 | 3/2008 | Mlinarsky et al. | |
| 7,395,060 B2 | 7/2008 | Liu | |
| 7,398,056 B1 | 7/2008 | Ebert et al. | |
| 7,508,868 B2 | 3/2009 | Chang | |
| 7,539,489 B1 | 5/2009 | Alexander | |
| 7,555,420 B2 | 6/2009 | Wang et al. | |
| 7,606,165 B2 | 10/2009 | Qiu et al. | |
| 7,693,082 B2 | 4/2010 | Wright | |
| 7,809,404 B2 | 10/2010 | Daniels et al. | |
| 8,150,675 B1 | 4/2012 | Ortmanns et al. | |
| 8,213,957 B2 | 7/2012 | Bull et al. | |
| 8,364,090 B2 | 1/2013 | Ramasamy et al. | |
| 2002/0066055 A1 | 5/2002 | Kim | |
| 2003/0061018 A1 | 3/2003 | Snyder | |
| 2003/0236089 A1 | 12/2003 | Beyme et al. | |
| 2005/0004787 A1 | 1/2005 | Kubischta et al. | |
| 2005/0085223 A1 | 4/2005 | Liu | |
| 2006/0040616 A1 | 2/2006 | Wheatley | |
| 2006/0046658 A1 | 3/2006 | Cruz et al. | |
| 2006/0072466 A1 | 4/2006 | Wang et al. | |
| 2006/0209866 A1 | 9/2006 | Steenkiste et al. | |
| 2006/0223522 A1 | 10/2006 | Guo et al. | |
| 2006/0229018 A1 | 10/2006 | Mlinarsky et al. | |
| 2006/0229019 A1 | 10/2006 | Mlinarsky | |
| 2006/0229020 A1 | 10/2006 | Mlinarsky et al. | |
| 2006/0233111 A1 | 10/2006 | Wright | |
| 2006/0239198 A1 | 10/2006 | Mlinarsky et al. | |
| 2006/0252419 A1 | 11/2006 | Liu | |
| 2006/0264178 A1 | 11/2006 | Noble et al. | |
| 2007/0019769 A1 | 1/2007 | Green et al. | |
| 2008/0020746 A1* | 1/2008 | Alexandar | H04W 24/06 455/423 |
| 2008/0049664 A1* | 2/2008 | Austin | H04W 16/18 370/328 |
| 2008/0056340 A1 | 3/2008 | Foegelle | |
| 2008/0239972 A1 | 10/2008 | Omar | |
| 2009/0047925 A1 | 2/2009 | Rahman | |
| 2009/0094492 A1 | 4/2009 | Music et al. | |
| 2009/0135843 A1* | 5/2009 | Veillette | G01D 4/004 370/406 |
| 2009/0305702 A1 | 12/2009 | Toppinen et al. | |
| 2010/0233969 A1 | 9/2010 | Frolik et al. | |
| 2010/0273504 A1 | 10/2010 | Bull et al. | |
| 2010/0304686 A1 | 12/2010 | Kennedy et al. | |
| 2011/0217937 A1 | 9/2011 | Cook | |
| 2011/0230143 A1 | 9/2011 | Lundstrom et al. | |
| 2011/0263215 A1 | 10/2011 | Asplund et al. | |
| 2011/0306306 A1 | 12/2011 | Reed | |
| 2012/0309323 A1 | 12/2012 | Guo et al. | |
| 2013/0021912 A1 | 1/2013 | Finlow-Bates et al. | |
| 2014/0024318 A1 | 1/2014 | Sevindik et al. | |

OTHER PUBLICATIONS

Proximity Searching with GeoHash, 4 pps, accessed Dec. 22, 2010 at http://www.synchrosinteractive.com/blog/1-software/38-geohash.

Eppstein, David, Geometry in Action, Cartography and Geographic Information Systems, accessed Dec. 22, 2010 at http://www.ics.uci.edu/~eppstein/gina/carto.html.

Algorithm for Finding Nearby Points?-Stack Overflow, http://stackoverflow.com/questions/838344/algorithm-for-finding-nearby-points, accessed Dec. 22, 2010, 3 pp.

Butler, B., Playing Nice—LNS and Hybrid location technologies, EETimes, Dec. 8, 2009.

Kojo, Seawind: a Wireless Network Emulator, Proceedings of 11th GI/ITG Conference of Measuring, Modelling and Evaluation of Computer and Communication Systems, 2001, 16 pages.

CiteSeerX—Seawind: a Wireless Network Emulator, 2001, 2 pages, http://citeseerx.ist.psu.edu/viewdoc/summary?doi=10.1.125.3281.

Kojo, Seawind: a Wireless Network Emulator, Feb. 27, 2014, 16 pages.

CiteSeerX—Seawind: a Wireless Network Emulator, 2001, 2 pages.

Kojo, Seawind: a Wireless Network Emulator, 2001, 16 pages.

Global Positioning System. Wikipedia, the Free Encyclopedia. last modified on Nov. 6, 2012, retrieved on Nov. 9, 2012. Retrieved from the internet <http://en.wikipedia.org/w/index.php?title=Global_Positioning_System&oildid=521739076>.

GNSS Product Design, INS: Integrated Navigation Systems, GNSS Solutions. Retrieved on Sep. 21, 2012 at 8:06am. Retrieved from the internet <http://inavsystems.com/index_files?Page607.htm>.

* cited by examiner

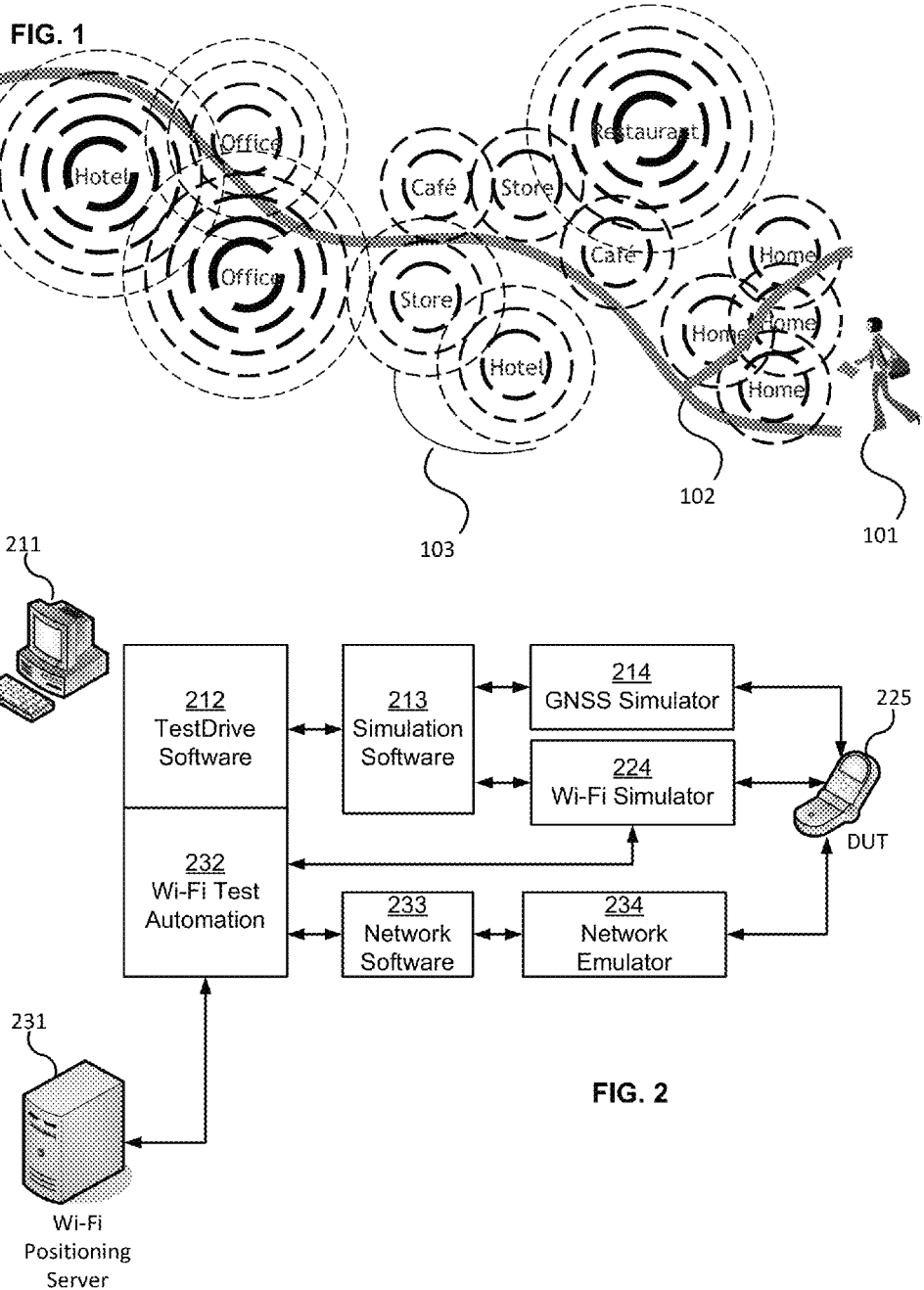

| AP ID | MAC Address | SSID | Std | Ch | EIRP | Path loss | RSSI | Lat | Long | Height | Range | Sec |
|---|---|---|---|---|---|---|---|---|---|---|---|---|
| 1 | 0000025b23187 | PERF2NDF_QQR | g | 8 | 15 | 94.75 | -79.75 | 32.9018 | -117.202 | 75 | 537 | wpa |
| 2 | 00409c4417a | none | g | 6 | 15 | 95.00 | -80.00 | 32.8972 | -117.203 | 75 | 550 | wpa |
| 3 | 001c4f04e98 | GJ Wireless | g | 7 | 15 | 93.25 | -78.25 | 32.8959 | -117.208 | 75 | 458 | wpa |
| 4 | 00095b5d3410 | jetWireless | g | 5 | 15 | 93.25 | -78.00 | 32.897 | -117.205 | 75 | 441 | wpa |
| 5 | 000223fba9e0 | 153324 | b | 1 | 15 | 87.25 | -72.25 | 32.9002 | -117.209 | 75 | 226 | wpa |
| 6 | 0014805caa2e86 | default | g | 6 | 15 | 82.25 | -88.00 | 32.9000 | -117.209 | 75 | 141 | wpa |
| 7 | 0008d87d4dc | ihd | g | 6 | 10 | 93.75 | -78.50 | 32.9018 | -117.205 | 75 | 478 | wpa |
| 8 | 0022d3ba7c3 | 00485223188888287 | g | 8 | 15 | 84.00 | -80.75 | 32.8905 | -117.208 | 75 | 154 | wpa |
| 9 | 0004127438c | THERACELL | b | 6 | 15 | 93.75 | -78.50 | 32.8917 | -117.202 | 75 | 470 | wep |
| 10 | 001217067ed | linksys | b | 8 | 15 | 93.50 | -78.50 | 32.9018 | -117.202 | 75 | 464 | wep |
| 11 | 0022dd123b6 | none | b | 6 | 15 | 91.00 | -78.00 | 32.8979 | -117.205 | 75 | 349 | wep |
| 12 | 00045ace24d9 | linksys | g | 9 | 15 | 92.00 | -77.00 | 32.8979 | -117.205 | 75 | 392 | wps |

DUT Latitude 32.900784  Longitude -117.207153  Height 101.403302

| AP ID | MAC address | SSID | Std | Ch | ERP | Path loss | RSSI | Sec |
|---|---|---|---|---|---|---|---|---|
| 1 | 000252937130 | mobilepoint | g | 11 | 15 | 55.90 | -40.00 | open |
| 2 | 001e7a28d140 | {} | g | 1 | 15 | 77.00 | -62.00 | open |
| 3 | 002568d7d986 | 025HW002568D7D986 | g | 6 | 15 | 79.00 | -64.00 | open |
| 4 | | | | | | | | |

Columns: 712, 713, 714, 715, 716, 717, 718, 723

FIG. 9

(Tabs: Emu | Rep | Sim | Config | Start | Sim | Status | Control | Setup)

Control SimGEN [✓]   SimGEN IP: 10 . 24 . 4 . 83   [Submit]  — 903 wardrive_99   [Load File]

FIG. 10

(Tabs: Emu | Rep | Sim | Config | Start | Sim | Status | Control | Setup) — 1001

Access Point Data Base File  [_____]  [Browse]  [Submit]
Path Loss Model — 1003  [free-space ▼]  [Cancel]
Two-slope Model Type — 1005  [_____]  [Save]
Shadow Fading  [✓]  — 1007

FIG. 11

WIFI POSITIONING BENCH TEST METHOD AND INSTRUMENT

RELATED APPLICATION

This application is a continuation application of U.S. application Ser. No. 12/976,756, filed on Dec. 22, 2010, entitled "WIFI POSITIONING BENCH TEST METHOD AND INSTRUMENT", which claims the benefit of U.S. Provisional Patent Application No. 61/325,150 filed Apr. 16, 2010 by inventor Peter George Boulton, both of which are hereby incorporated by reference.

This application is related to U.S. patent application Ser. No. 12/850,986, entitled "Virtual Drive Test Tool" filed Aug. 5, 2010, which claims the benefit of U.S. Provisional Patent Application Nos. 61/231,652 and 61/231,540, both filed Aug. 5, 2009. The related non-provisional and provisional applications are hereby incorporated by reference.

BACKGROUND OF THE INVENTION

The present invention relates to simulation on a lab workbench of conditions that would be encountered by a mobile device during a so-called drive test, which involves transporting the mobile device along a course so that it encounters fading and changing wireless access points, which normally are used to connect the mobile device to a wireless network, but in this case are used to locate the device. The instrument and method also support parametric testing of transceivers used for WiFi positioning and, optionally, coordination between GNSS positioning and WiFi positioning.

Global Navigation Satellite Systems ("GNSS") provides excellent positional accuracy in a wide range of environments. A GNSS receiver determines the time a signal from a GNSS satellite takes to travel to the receiver and converts this time to distance using the constant speed of electromagnetic waves. By calculating the distance to three, or more, satellites and knowing the position of each satellite, the receiver can compute its exact position on the Earth's surface. The ubiquitous GPS system used in the US is one variety of GNSS.

GNSS struggles where signals can be obscured, such as in the "urban canyon" and particularly indoors. In such circumstances, alternative positioning methods are useful to support commercial location-based services and emergency location schemes.

Other positioning systems determine approximate locations from cellular tower signals, instead of satellite signals. In the US, South Korea and Japan where CDMA mobile phone systems are deployed, the system supports a pseudo-satellite capability called AFLT. This uses the time-synchronous nature of the signals; phones can measure the transmission delay from the cell tower. Using knowledge of the cell tower position, the network can determine a phone's location within 100 m or so. For other types of mobile phone systems, popular mobile phone-based positioning technologies include cell-ID and enhanced cell-ID. With cell-ID, receiving a signal from a particular cell tower suggests a location within a km or less. With enhanced cell-ID, sectored cells can give an angle of arrival to narrow down a user's location.

Widespread use of WiFi for wireless access points presents a new source of location signals. Access points ("APs") are widely visible to mobile devices, both commercially deployed as 'Hot-Spot' APs in cafés, bars, shopping centers, railway stations, etc., and privately hosted APs in homes and businesses. The approximate range to an AP can be determined by measuring the power level of the WiFi beacon transmission, since signal power decreases approximately with the square of the distance. The IEEE 802.11 standards for WiFi include a beacon frame as a type of management frame. The typical beacon frame is about fifty bytes long and includes source identification information. The destination address is set to a constant, such as all ones, so that all receivers within range will process the beacon.

Typically, software within the mobile device sends details of the visible APs, from their beacons, to positioning service servers together with identifications of nearby cellular phone base stations. The location server accesses a continuously updated database of APs. The location server calculates and returns the location to that device. Alternatively, a location service provider can provide a power-level or visibility map for APs in an area. The mobile device uses the AP location data to determine its location based on the signature of power levels, applies a form of maximum likelihood algorithm, or from a technique similar to fingerprinting.

There are several suppliers of WiFi positioning services that typically use data generated by driving surveys and/or subscriber reports, or through direct on-line registration of deployed access points with the supplier. It is believed that estimates of the location and transmission power of unregistered access points are made using multiple observations of power of basic signaling at known locations. Suppliers can offer a tiered accuracy service which starts with GPS, drops to WiFi, used when GPS coverage is poor, and finally degrades to cell-ID.

An opportunity arises to perform device testing that does not rely on field testing, but instead emulates beacon signals from multiple WiFi Access Points. Better, more easily configurable and controllable, more repeatable testing and development of positioning systems may result.

SUMMARY OF THE INVENTION

In various embodiments, we disclose:

An instrument that tests devices that include WiFi transceivers used for WiFi positioning in a controlled laboratory environment.

An instrument that tests devices that include WiFi transceivers used for WiFi positioning at the boundary of their capabilities.

An instrument that tests devices that include WiFi transceivers under environmental conditions representative of the real world, particularly including variable power level received due to changing distance between an access point and the device, signal obstruction and attenuation, and other signal instabilities.

An instrument that tests devices that include WiFi transceivers under environmental conditions of device motion among a large distribution of hundreds of visible Access Points, causing currently detectable Access Points to change with time.

As a further aspect of any of the instruments mentioned above, including tests of devices that include both the WiFi positioning and GPS/GNSS positioning through provision of an accompanying GPS/GNSS simulator.

As a further aspect of any of the instruments mentioned above, including tests of selection by the device between use of the WiFi positioning and the GPS/GNSS positioning through provision of an accompanying GPS/GNSS simulator.

As a further aspect of any of the instruments mentioned above, including tests of interoperability of WiFi positioning and GPS/GNSS positioning through provision of an accompanying GPS/GNSS simulator.

We also disclose methods, including a method of testing devices that include WiFi transceivers used for WiFi positioning in a controlled laboratory environment.

A method of testing devices that include WiFi transceivers used for WiFi positioning at the boundary of their capabilities.

A method of testing devices that include WiFi transceivers under environmental conditions representative of the real world, particularly including variable power level received due to changing distance between an access point and the device, signal obstruction and attenuation, and other signal instabilities.

A method of testing devices that include WiFi transceivers under environmental conditions of device motion among a large distribution of hundreds of visible Access Points, causing currently detectable Access Points to change with time.

As a further aspect of any of the methods mentioned above, including tests of devices that include both the WiFi positioning and GPS/GNSS positioning through provision of an accompanying GPS/GNSS simulator.

As a further aspect of any of the methods mentioned above, including tests of selection by the device between use of the WiFi positioning and the GPS/GNSS positioning through provision of an accompanying GPS/GNSS simulator.

As a further aspect of any of the methods mentioned above, including tests of interoperability of WiFi positioning and GPS/GNSS positioning through provision of an accompanying GPS/GNSS simulator.

We further disclose machine readable, non-transitory storage media holding program instructions that instruct a test instrument to carry out the methods disclosed. And, machine readable storage media holding program instructions that, when combined with hardware, produce any of the instruments disclosed.

BRIEF DESCRIPTION OF THE DRAWINGS

FIG. 1 depicts a mobile device moving through a field of APs.

FIG. 2 is a high level block diagram of an RF test setup including a WiFi simulator, a GNSS simulator and a cellular wireless network emulator.

FIGS. 5-7 illustrates an interface that could be used to show the progress of a drive test.

FIGS. 8A-C depict interfaces that can be used with emulation or replay mode.

FIG. 9 depicts the relatively simple interface to replay a location sequence.

FIG. 10 depicts configuration of the system in so-called simulation mode.

FIG. 11 depicts a front panel display used to view the current status of a system indicating which APs are being generated.

DETAILED DESCRIPTION

Emulating Access Points

Figure 3:
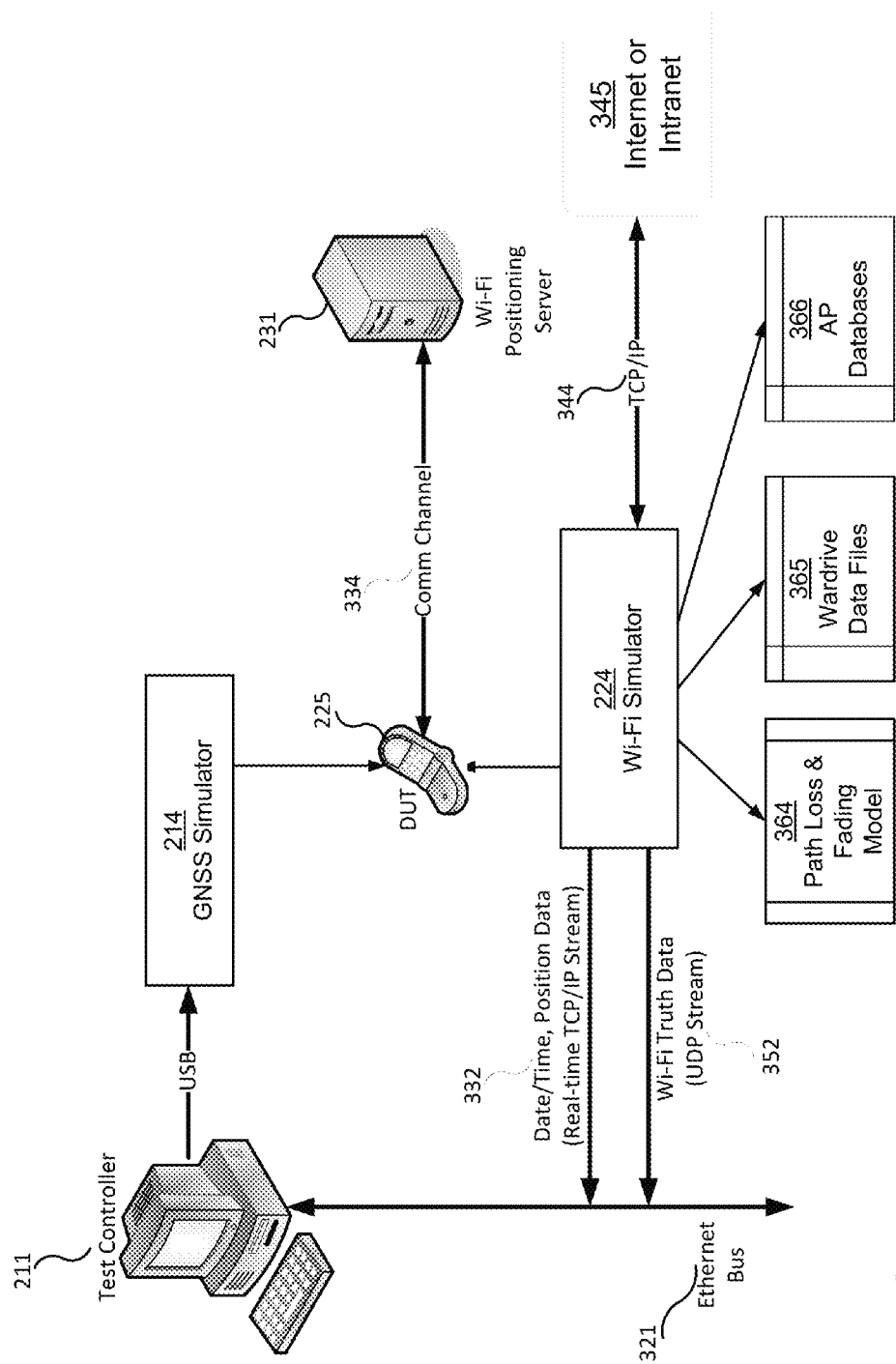
FIG. 3 provides additional detail of databases and communication channels for a test using WiFi and GNSS simulation.

We disclose testing of devices that use proximity to WiFi access point locations to locate or assist in locating the device's position. The instruments and methods disclosed emulate many access points simultaneously visible to a device under test. By many APs, we mean 10 or more, 16 or more, 24 or more, 32 or more, or even a larger number of APs.

We use the term "WiFi" broadly to refer to wireless access to local area networks (WLAN), typically via 802.11a/b/g/n compliant access points. The largest current population of APs available to be used for WiFi positioning is access points compliant with 802.11b/g standards. Our disclosure also covers APs compliant with the 802.11a standard, which has lost popularity, and with the newer 802.11n standard, which is gaining acceptance. We mean to distinguish between wireless connection to local area networks (WLAN) using these standards and wireless connection to wide-area networks (WWAN) using RF technologies such as WiMax, and cell technologies typically used for voice in cellular telephone networks. The WiFi technologies for wireless access are relatively short range, compared to cell phone cells or WiMax. In a given area, there are likely to be many WLAN access points available for WiFi positioning.

Emulating an access point includes emulating its network/packet and RF characteristics. The network/packet characteristics of the access point include its MAC address or a similarly unique identifier, its SSID, one or more channel numbers used, a particular IEEE 802.11 protocol used (a/b/g/n), and security protocol. The RF characteristics of the access point include EIRP and path loss or, for replay, received signal strength (RSSI). The signals that simulate the many access points are combined and supplied via a cable or transmitted over the air to the device under test ("DUT"). The DUT is expected to distinguish among the many emulated APs and interact with a positioning server, usually located within the network or accessible via the Internet. Alternatively, the DUT may maintain its own database of AP locations, allowing it to calculate its position without real time connection to a live AP location database. Calculation of the device's approximate position can use trilateration or "fingerprinting."

Emulation, Replay and Drive Test Modes

Most tests of WiFi positioning use one of three modes: emulated, replay or simulated modes. Emulated test mode supports parametric testing. Replay test mode simulates a drive test, typically by replaying based on data recorded while war-driving. Simulated test mode allows a user to specify a drive path and have the system automatically derive test signals from an AP location database.

In so-called emulation test mode, the test system disclosed operates as a controllable instrument, where the user can define the fundamental static characteristics of each AP signal being received. These characteristics include its MAC address, SSID, signal channel number and incident power level. Sufficient independent AP resources are available to emulate all 14 possible 802.11 channels simultaneously. This emulation mode supports parametric testing, where all WiFi frequency channels may be represented simultaneously. Unique identifiers and power levels can be predefined to test for an expected result. This emulation mode is particularly useful in conformance and manufacturing tests.

In so-called replay test mode, the system determines AP selection and received power level directly from a time-ordered script of AP visibility and AP characteristics. This script can be derived from field observations (sometimes called war-driving) or created artificially. Replaying a script assures reproducibility, but requires scripting the test.

Simulated drive testing involves specifying a drive path and having the test system automatically select a number of visible APs, given the simulated location of the device under test, and emulate the signals from the selected APs points. As the simulated location of the device under test changes, the system dynamically re-creates an operational environment in which the device under test moves along a simulated location sequence, through a collection of static APs, with power levels being a function of distance from the AP (path loss) and its transmit power. A stochastic fading model may also be overlaid on the power profile. Obstructions and line-of-sight effects further can be taken into account. As in emulated mode, the MAC address and channel number are user defined but are contained in an AP database along with AP location and effective radiated power (ERP). APs are selected automatically and dynamically from those visible to the DUT, based on highest incident power, distance from simulated DUT location, or a combination of factors.

THE FIGURES

FIG. 1 depicts a device moving through a collection of static APs. A user 101 follows a path 102 through many APs 103 of varying strength. The hosts for the APs may be private or commercial.

FIG. 2 is a high level block diagram of a WiFi simulator 224 used in conjunction with a GNSS simulator 214 and a network emulator 234. The WiFi simulator is the focus of this disclosure. The GNSS simulator may be a device such as commercially available from Spirent, model numbers GSS6560 or GSS6700. The network emulator is also commercially available from Spirent, such as SR3420, SR3452 or SR3462. The GNSS simulator supplies signals that the DUT would receive from satellites for positioning. This simulator may switch between clear sky and indoor modes and may produce noise and/or multipath characteristics of urban canyons and other GNSS-hostile environments. The network emulator supplies signals that the DUT would receive from cellular towers, such as 2G, 3G or 4G network towers. The network emulator may simulate voice traffic and also may carry data. The network emulator 234 and WiFi simulator 224 provide alternative channels to link the DUT 225 to a WiFi positioning server 231. Simulation control software 213 may coordinate signals generated by the GNSS and WiFi simulators, using the same simulated DUT location for generation of both types of signals. Network software 233 works in connection with the network emulator 234. From a test console 211, a user may operate test drive software 212 and WiFi test automation software 232 to exercise replay and simulation test modes.

FIG. 3 provides additional detail of databases and communication channels for a test using WiFi and GNSS simulation. The network emulator is not show in this figure, so that additional detail can be provided for positioning components. Common features of FIGS. 2-3 retain the reference numbers used above. This figure depicts use of a USB connection 312 from test console 211 to the GNSS simulator 214 and an Ethernet bus 321 connecting the console with the WiFi positioning simulator 224, but the same bus could be used for both, or a different wired or wireless busses could be used. The cellular network communications channel 334 is depicted as one path from the DUT to a WiFi positioning server 231. An open AP channel, described below, provides another path: a network connection 344, for instance, a TCP/IP connection, through the Internet 345 to the WiFi positioning server 231 or through an intranet to a live or synthetic positioning server.

The WiFi positioning simulator provides a reliable TCP real-time data stream 332 to the test controller and also broadcasts collected data over an unreliable UDP channel 352. More detail is given in the description of FIG. 4 below.

This FIG. 3 also depicts models and databases that are useful for various modes of testing. Path loss and fading models 364 are useful for at least simulation mode. War-drive files 365 are used in replay mode. A database of AP characteristics 366 is used in at least simulation mode.

Figure 4:
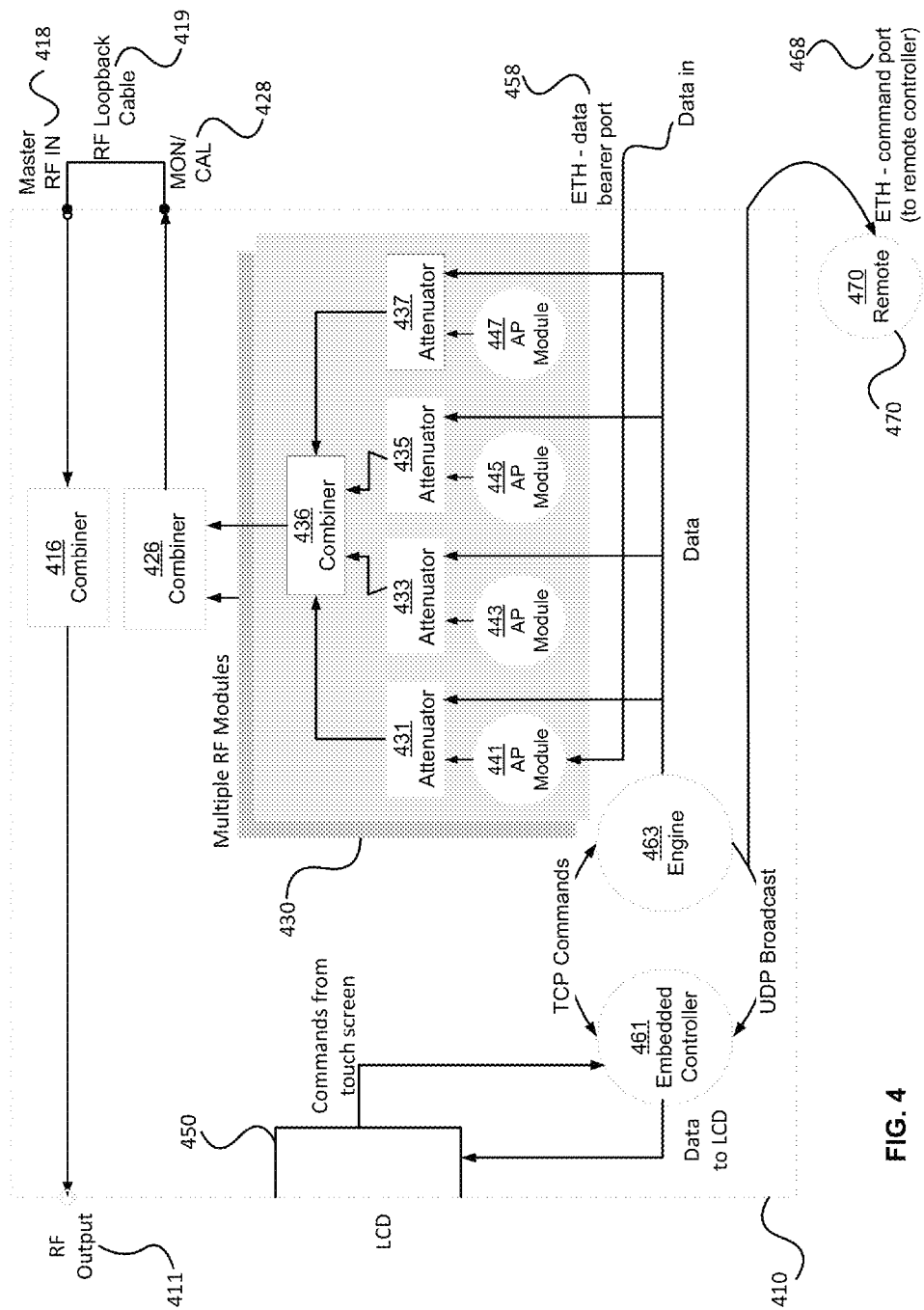
FIG. 4 is a high level block diagram of a test device that emulates 24 APs, using six RF modules.

FIG. 4 is a high level block diagram of a test device 410 that emulates 24 APs, using six RF modules 430. The embodiment uses an embedded controller 461 to interface between the processor or engine 463 that controls the RF modules 430 and a front-panel LCD user interface 450. The LCD can display configuration details and scenario parameters during a simulation. The touch-screen LCD also can be used to configure the signal generator parameters.

The RF modules depicted include four AP modules 441, 443, 445, 447 and attenuators 431, 433, 435, 437 feeding a combiner or mixer 436 to provide a single RF output. Combining 426 outputs of six RF modules, this system configuration is capable of emulating 24 APs at the signal generator's RF output port 428, 411. In some configurations, an RF loopback cable 419 connects 418 the rear panel MON/CAL port 428 of a stand-alone signal generator to the front panel RF output port 411. In an expansion configuration using a second WiFi instrument to provide a further 24 APs, the MON/CAL port sources the expansion signals from the expansion unit and is connected to the AUX RF IN port of the main instrument for routing the now-combined 48 APs to its front panel.

In some applications, the engine 463 continually broadcasts UDP packets 468 to all devices on its network. An embedded controller 461 can be used to control the engine. A remote device 470 connected to this network can receive these UDP packets and display the same information that the embedded controller 461 displays on the front-panel LCD 450.

The embedded controller 461 sends commands via TCP to the engine 463. For example, when a user taps "Config," on the front-panel LCD, the controller sends a command to the engine. The engine determines whether the embedded controller is a "listener" or "controller." When the embedded controller has controller status, a user can control the engine 463 (and therefore the signal generators 430) from the front-panel LCD 450. The LCD can continually display test data that it receives from the engine. A front-panel status bar or other display can be programmed to show the status of UDP and TCP connections, as well as controller details.

When using the front-panel LCD to enter parameters for an AP (for example, when using emulation mode), the user is entering details into the embedded controller. Tapping "submit" transfers these parameters from the embedded controller to the engine via TCP. Tapping "status" reads UDP packets from the engine and displays those packets relating to the APs on the front-panel LCD. Reading UDP packets and transmitting TCP commands allows a remote device 470 to control the signal generator 410 via a network 468.

Figure 8B:
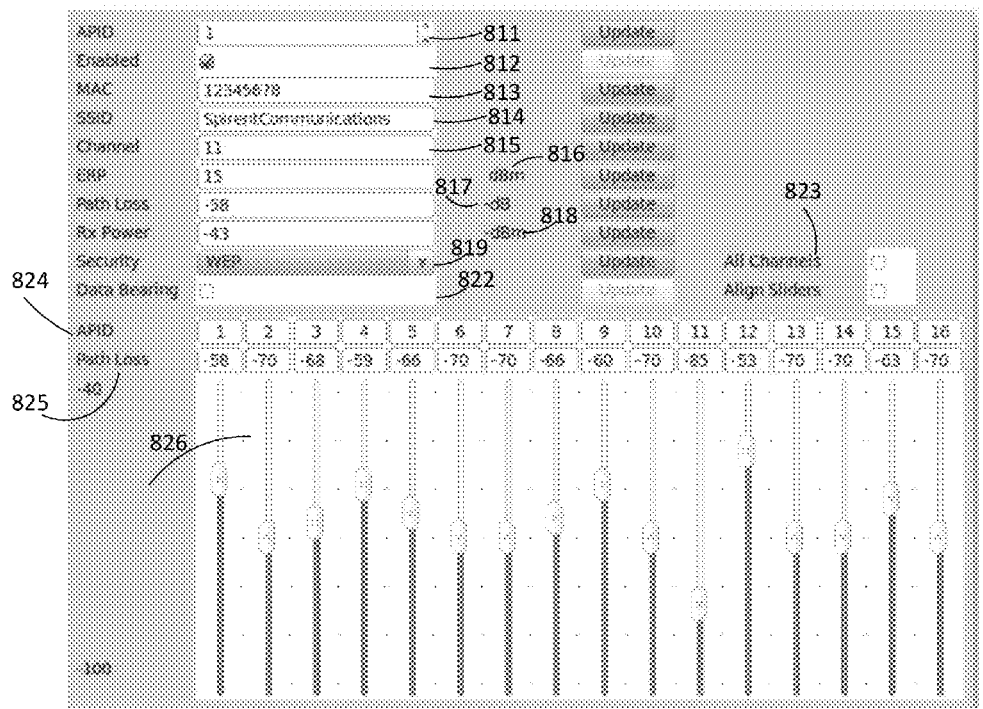
Figure 8A:
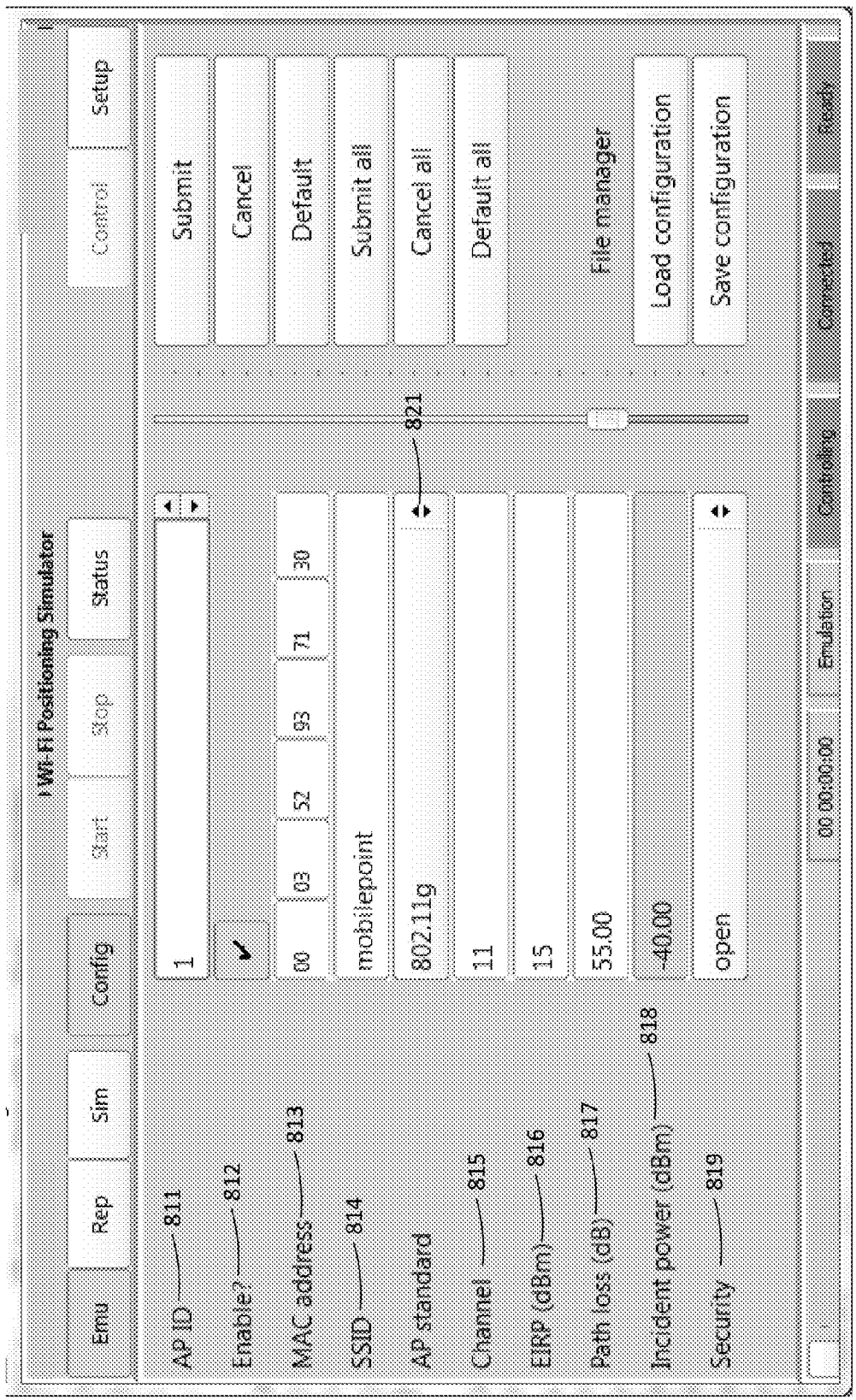
Figure 11:
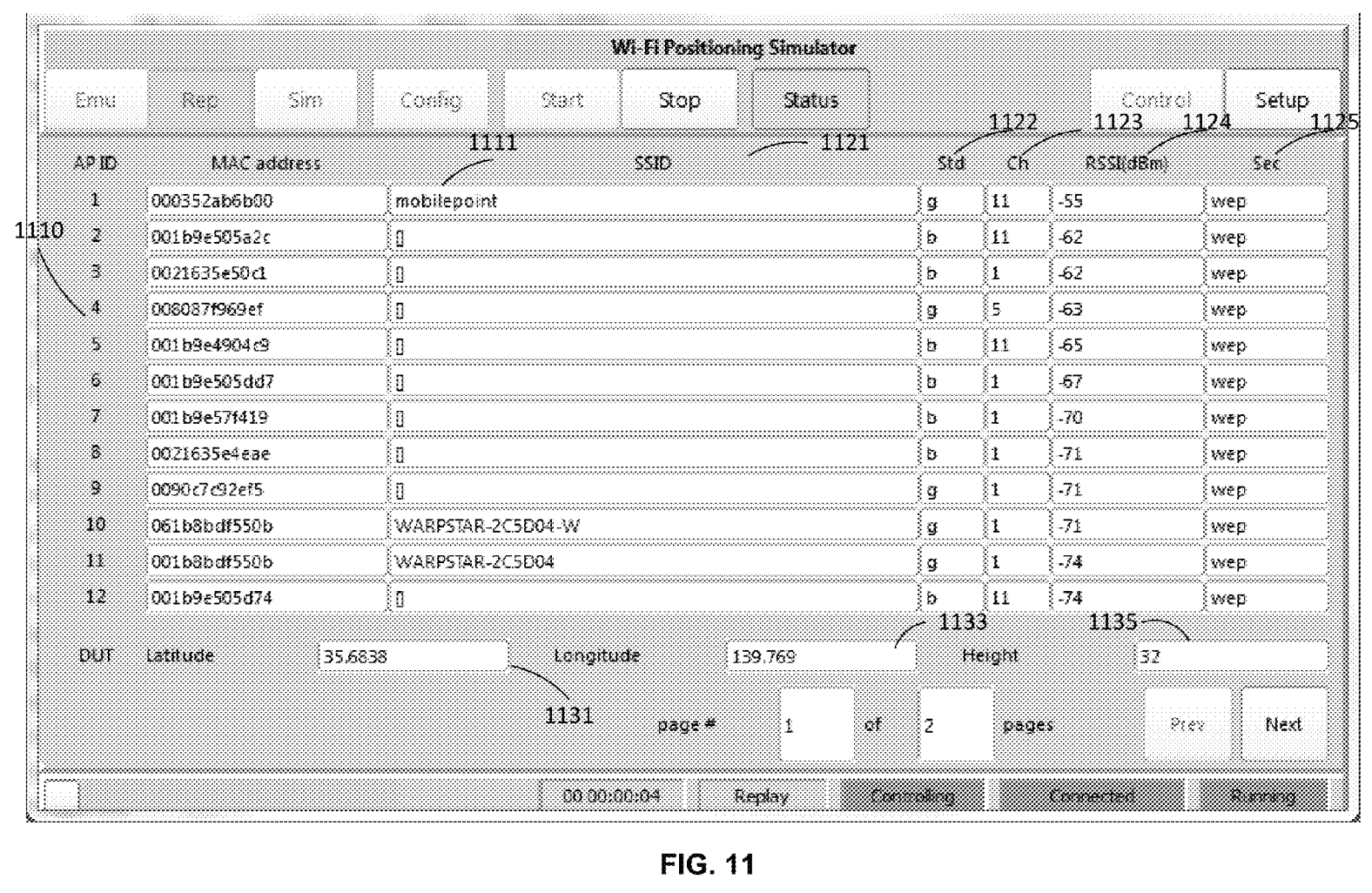

FIG. 8A depicts an interface that a user could interact with to configure emulation mode. The mode is indicated by the buttons along the top of the display, "Emu" and "Config". This interface may be displayed on the front panel LCD or a remote terminal. Using a keyboard, mouse, touch sensitive screen or other interface, the user enters data in the fields indicated: AP id to internally distinguish among emulated APs 811; enable, to control whether a particular emulator is active 812; MAC address, in hex 813; SSID 814; emulated standard, 802.11a/b/g/n 821; channel, which is 1-14 in 802.11b/g standards 815; EIRP, in dBm 816; path loss in dB 817; incident power, in dBm 818; and security protocol 819. Incident power may be calculated from EIRP and path loss, or it can be an alternative value for user entry. A supported range for EIRP is 0 to 15 dBm in 1 dBm steps, but other ranges and step sizes could be used. A path loss range is 40 to 100 dB in 0.25 dB steps. Incident power is a calculated value, EIRP—path loss. Alternatively, as in replay mode, the incident power could be entered directly. The security protocol may be open, WEP, WPA, WPA2, etc. Typically, a limited number of the emulators are supported for "open" access between the DUT 225 and an external Ethernet connection 458. A status display as depicted in FIG. 11 or something similar can be used to view progress entering parameters or generally to view the current configuration of a system. FIG. 8B depicts an alternative interface configuration. This configuration adds slider controls 826 for multiple emulated APs 824 and numerical values for path loss 825, which correspond to the sliders. Additional controls are illustrated for whether an emulated AP communicates data to an outside network 822 and for controlling all channels or all sliders 823 in a single action. FIG. 8C depicts an alternative status display used in emulation mode. The reference numbers in FIG. 8C are repeated from FIG. 7, which is discussed below.

FIG. 9 depicts the relatively simple interface to replay a simulated location sequence. When a compatible external control program is used, a control is checked 901 and an IP address at which to connect 903 is specified. Then a parameter file 905 is specified. A conventional file tree browser can be used to select a file.

In one file format, a separate line holds the information for each simulated location in the sequence. For instance, lines may be formatted appear as:
timestamp1, latitude, longitude, height, mac_address_1, ssid_1, rx_power_1, WiFi_standard_1, channel_1, security_1, flags_1, mac_address_2 and so on for each access point
timestamp2, latitude, longitude, height, mac_address_1, ssid_1, rx_power_1, WiFi_standard_1, channel_1, security_1, flags_1, mac_address_2 and so on for each access point FIG. 11, mentioned above, also can be used to view status in replay mode.

FIG. 10 depicts configuration of the system in so-called simulation mode. Again, a control file is identified 1001, which is loaded with simulation parameters. Either the test device or an external controller can process the control file and generate commands for the AP emulators. Parameters included in the interface include path loss model type 103, supplemental model type parameters for a two-slope model 1005, and a shadow fading control 1007. One path loss model is the free-space loss for an RF signal, where power reduces proportionally with the square of the distance from the transmitter:

$$FSPL = \left(\frac{4\pi d}{\lambda}\right)^2$$

$$= \left(\frac{4\pi df}{c}\right)^2$$

$$FSPL(\text{dB}) = 10\log_{10}\left(\left(\frac{4\pi}{c}df\right)^2\right)$$

$$= 20\log_{10}\left(\frac{4\pi}{c}df\right)$$

$$= 20\log_{10}(d) + 20\log_{10}(f) + 20\log_{10}\left(\frac{4\pi}{c}\right)$$

$$= 20\log_{10}(d) + 20\log_{10}(f) - 147.55$$

Another path loss model is the two-slope model.

$$\text{Two-slope path loss}(db) = 10 * n2 * \log\left(\frac{d}{db}\right) + 10 * n1 * \log(db) + k,$$

where
n2 is the slope, or path-loss exponent, in the region where d>db
n1 is the slope, or path-loss exponent, in the region where d≤db; this region has free-space path loss, so n1=2
d is the separation of the device and the AP
db is the breakpoint distance
k is a constant.

Depending on the parameters chosen for db, n1 and n2, this two-slope model can be used to describe flat fading, residential, small office, large office, indoor or outdoor space. See, e.g., "New Horizons in Mobile and Wireless Communications: Radio Interfaces." Ed. R. Prasad and A. Mihovska. Artech House Publishers, 2009. 68.

A variation of either of these models is sector impaired simulation of obstructions. In this variation, the AP database includes directional attenuation parameters that can be populated to indicate an obstruction. The points of a compass can be sectored, for instance into four, eight or 16 sectors and values encoded for attenuation resulting from obstructions in whatever directions obstructions have been recorded or are present.

Shadow fading also may be applied. In shadow fading, the RF power from the AP fluctuates with a Gaussian, normal or other distribution about the mean power.

Figure 5:
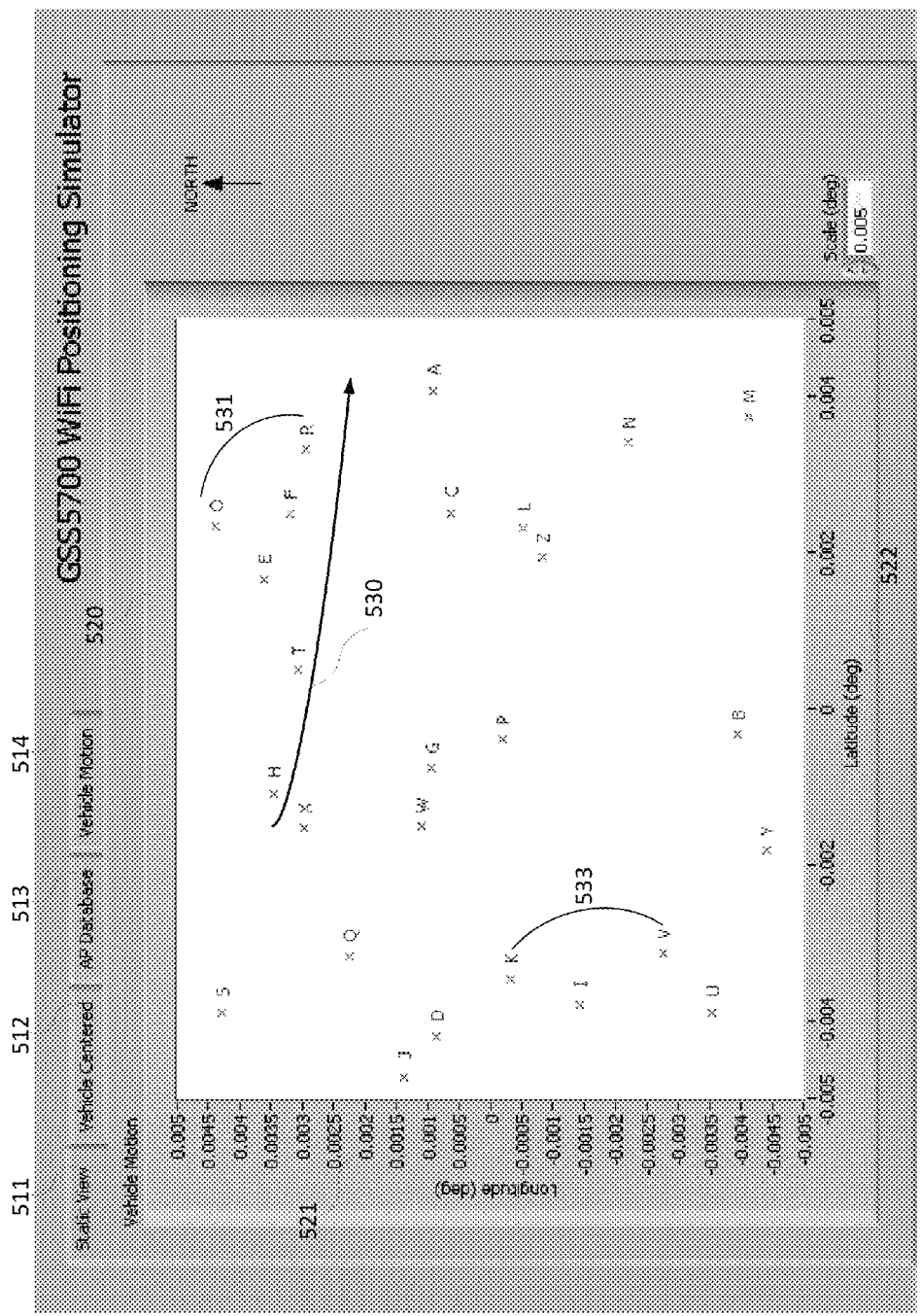
Figure 6:
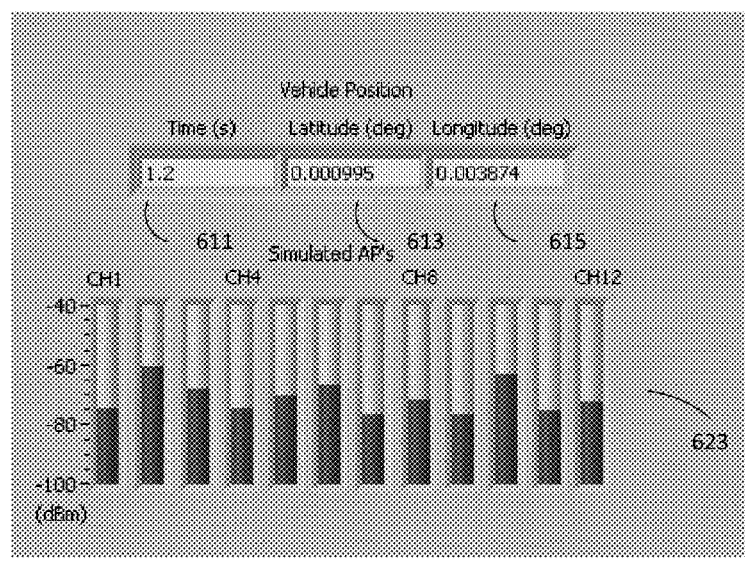

FIGS. 5-7 illustrate an interface that could be used to show the progress of a drive test. The view shown is the static view 511, with a vehicle path 530 added. Available views of similar data include vehicle centered 512, AP database 513, and vehicle motion 514 views. The frame 520 holds a map of APs positioned by longitude 521 and latitude 522. One set of APs 531 is close to the path 530 of travel. Another set pints 533 is distant. In simulation mode, the system determines the APs to emulate, generates signals with appropriately adjusted power, mixes or combines the signals and feeds them to the DUT via a coaxial or radiated connection. This positional relationship can be displayed by an AP status screen. (FIG. 7.)I FIG. 6 provides detail regarding the vehicle position. It includes test time 611, and the vehicle's latitude 613 and longitude 615. The relative power levels of some or all emulated APs can be graphically displayed 623, for instance using vertical bars.

FIG. 7 details AP status. Individual APs 710 are listed in rows. Characteristics of the emulated APs and their relationship to the simulated DUT location are arranged in columns. A MAC address 712, SSID 713 or similar AP identifier can be listed. The standard 714, such as part of the 802.11x standard, can be displayed, along with the active channel 715. The EIRP 716, path loss 717 and RSSI 718 can be indicated. The AP latitude, longitude and height 719, 720 and 721 are compared to the vehicle's position 725 (DUT) to calculate a range 722. Security 723 can be indicated.

Particular Device Embodiments

Figure 13:
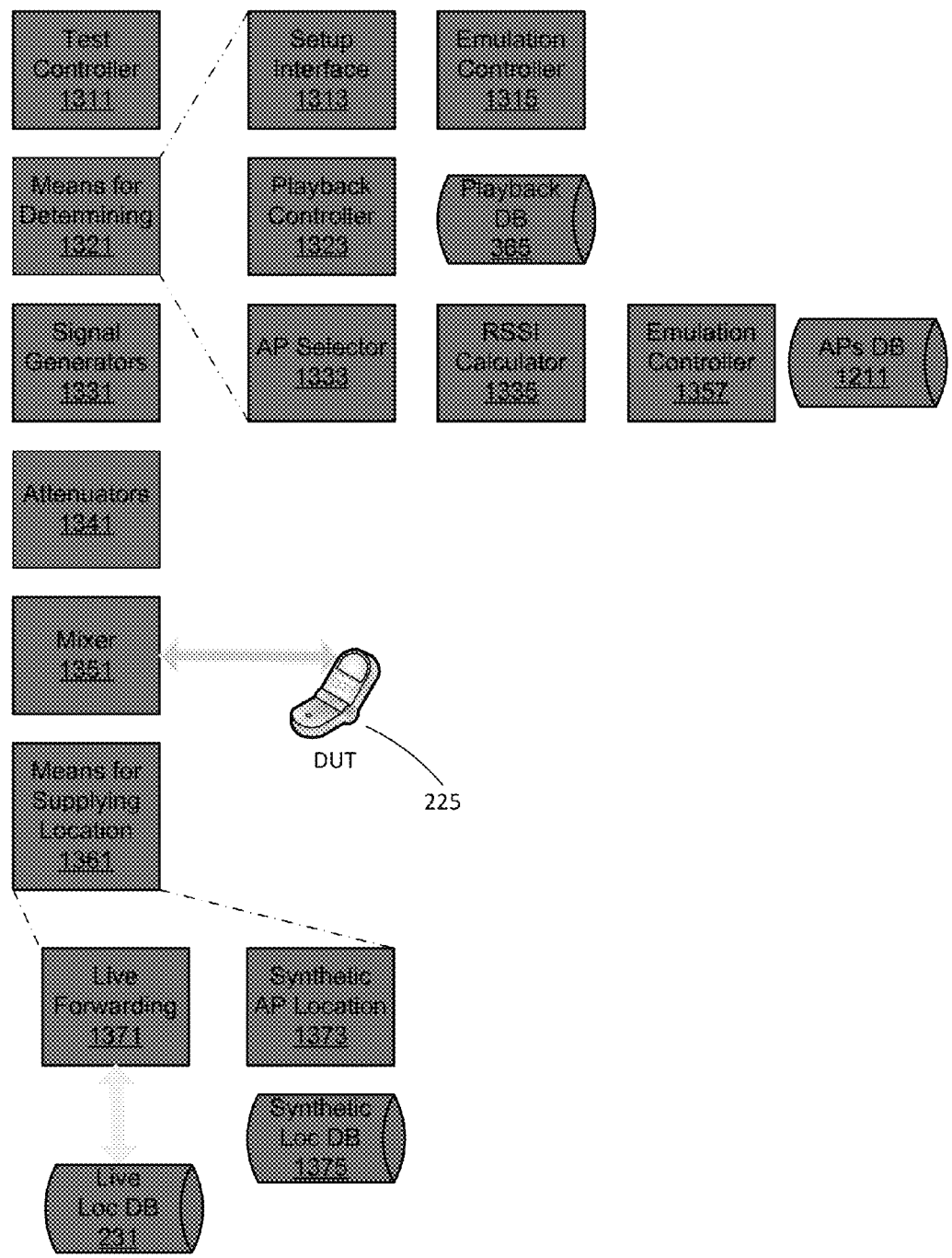
FIG. 13 is a high level block diagram of WiFi testing components that can be combined to produce a variety of devices.

FIG. 13 is a high level block diagram of WiFi testing components that can be combined in various ways to create a variety of devices. Device configuration depends, to a large degree, on the test mode of operation and whether GNSS positioning data is supplied along with the WiFi data.

The test controller 1311 is part of the system used in simulation mode. It supplies a sequence of simulated locations to the means for determining characteristics of emulated APs 1321. It also can supply the locations and other control parameters to a GNSS simulator, when WiFi and GNSS positioning are tested together.

The means for determining characteristics of emulated APs 1321 feeds parameters to the signal generators 1331. The structures that correspond to this means for determining depend on the test mode: so-called emulation, replay or simulation test modes.

For parametric tests in the so-called emulation mode, the means for determining 1321 includes a setup interface 1313 and an emulation controller 1315. This is a test of radio functionality, more than a test of location accuracy. A parametric test need not be tied to a simulated location. The setup interface is a man machine interface (MMI) that receives parameters from a user, either directly or by specification of a file into which test parameters have been loaded. To perform a parametric test, the emulation controller 1315 iterates through a sequence of signal generating parameters that will expose the DUT to ranges of operating parameters that test the DUT. A typical DUT parametric test will address some or all of: an ability to receive on all channels (e.g., on channels 1-14 for 802.11b/g); ability to handle varying numbers of emulated APs on a particular channel; and signal handling at varying received power levels. The means for determining 1321 sends signal generating parameters to the signal generators. Optionally, it may broadcast the current parameter over a network as it feeds the parameters to the signal generators, for analysis by other devices used in the test.

A parametric test can use WiFi and GNSS side-by-side. Parametric testing of the two positioning systems can vary their relative signal strength and/or noise impairments to test the DUT's choice between positioning options, its switch over time, its sharing of data to improve time to locate and similar DUT responses. The test controller 1311 can be used to coordinate the means for determining 1321 of the WiFi test with a GNSS simulator, as depicted in FIGS. 2-3.

For replay mode, the means for determining 1321 includes a replay controller 1323 and a replay database 365. The replay controller 1323 accesses the replay database 365 at various times during the test. The replay database may be a table or other data structure in memory, a flat file such as a CSV file, or a file stored by a database manager. The replay database includes at least simulated DUT locations and characteristics of AP signals to be received by the DUT at those locations. The replay controller 1323 feeds emulated AP parameters to the signal generators at various times during the test. It optionally may broadcast simulated DUT locations over a network as it feeds the parameters to the signal generators, for analysis by other devices used in the test.

A replay test can use WiFi and GNSS side-by-side. Replay testing of the WiFi positioning system can be combined, using a test controller 1311, with simulation of GNSS signals, as depicted in FIGS. 2-3. The test controller can communicate with the means for determining to vary the relative signal strength or impairments of the AP and satellite signals, to test the DUT's choice between positioning options, its switch over time, its sharing of data to improve time to locate and similar DUT responses. The test controller 1311 can coordinate GNSS simulation with the means for determining 1321 of the WiFi test with a GNSS simulator, by accepting position information from the replay database 365 that is broadcast by the replay controller 1323.

For simulation mode, the means for determining 1321 includes an AP selector 1333, a RSSI calculator 1335, an emulation controller 1357 and an AP characteristics DB 1211. The AP selector 1333 can include a variety structures or algorithms for selecting candidate AP and select emulated APs.

A first AP selector algorithm is brute force, evaluating the distance from all APs to the simulated DUT location to select candidate APs. When emulated APs are selected by distance alone, rather than RSSI at the DUT, brute force is a one part AP selector. Then RSSI is the criteria, the RSSI calculator 1335 is invoked for a selected group of nearby candidate APs, and selection among the candidates is based on RSSI.

A second potential algorithm would be to group APs by cell towers, generating lists of APs that are visible at the same time as the cell tower. This creates overlapping lists, each of which has a more manageable length than the entire AP list. Only APs in the lists corresponding to visible cell towers need be considered. When a simulated drive route is set, the cell towers along the route are readily determined either manually from a map, empirically (by driving) or automatically by comparing cell tower locations to points along the simulated drive. Then, the candidate APs can be selected from lists associated with the cell towers. The list of APs for one or more visible cell towers can be used directly. Optionally, two or more lists could be intersected, when multiple cell towers are visible to the DUT, to generate a list of candidate APs. Two structures for selecting among candidate APs involve distance and calculated RSSI at the simulated DUT location. The closest APs, determined by calculating distance, could be selected, regardless of their signal strength. Or, the RSSI at the simulated DUT location could be calculated for a predetermined number or range of candidate APs. Then, a distribution of APs, such as those with the highest RSSIs or a pseudo randomly selected sample of APs from a group of APs with RSSI above a threshold could be selected.

A third potential algorithm is attributed to Gustavo Niemeyer, known as Geohash. Mr. Niemeyer has written a Wikipedia article that describes this a latitude/longitude geocoding system. The Wikipedia article is being submitted with an IDS and is hereby incorporated by reference. Commentary and code that implements Geohash is available on the Groundspeak forum, under the topic "geohash.org, short links for referencing a position." In essence, Geohash would be used to interleave digits of latitude and longitude into a string. The low order positions of the string fine tune the location accuracy of the string. A geohash of 8 characters includes 20 bits each for latitude and longitude, specifying a location calculated to be no more than 0.019 kilometers away. A code of 7 characters is less precise, giving an error of 0.076 km or less—less than 80 meters. Using Geocodes or similar position encoding, a large database could rapidly be winnowed to a manageable number of candidate APs, beginning with a less precise geohash (shorter length) and using a more precise geohash if too many AP candidates are in associated with the initial geohash. Another compact code for latitude and longitude coordinates is described in U.S. Pat. No. 7,302,343, which is also incorporated by reference. These algorithms could be used to select candidate APs. Then, emulated APs would be selected from the candidate list as describe above.

A fourth potential group of algorithms is mentioned on the StackOverflow forum under the article "Algorithm for finding nearby points." Algorithms in this group would divide an area into polygons (e.g., rectangles) and chooses one more polygons that include or are near the simulated DUT location, thereby selecting a manageable number of candidate APs. The polygons can be managed in a variety of ways, including a quadtree, an RTree, a BSP tree, and nearest neighbor searching. Rectangular regions can be produced by queries against database indexes. For instance, the query parameters y>=b AND y<=d AND x>=a AND x<=c can be used to specify a rectangle with the top left most corner x(a) and y(b) and bottom most right corner x(c) and y(d)). These algorithms could be used to select candidate APs. Then, emulated APs would be selected from the candidate list as describe above.

The RSSI calculator 1335 is described above as using a free-space or two slope model. Optionally, stochastic fading and/or sectored attenuation can be applied to adjust the calculated RSSI. The RSSI calculator can be applied before, after or both before and after selection of emulated APs. If it applied after selection, an initially calculated RSSI may be refined by applying stochastic fading and/or sectored attenuation.

The emulation controller accepts a location in a simulated location sequence from the test controller 1331, invokes the AP selector, and calculates the AP characteristics for the emulated APs. For simulated DUT locations along the simulated locations sequence, the emulation controller sends emulation parameters to the signal generators. It optionally may broadcast simulated DUT locations over a network as it feeds the parameters to the signal generators, for analysis by other devices used in the test.

A simulation test can use WiFi and GNSS side-by-side. Replay testing of the WiFi positioning system can be combined, using a test controller 1311, with simulation of GNSS signals, as depicted in FIGS. 2-3. The test controller supplies simulated DUT locations to the means for determining 1321 and can systematically vary the relative signal strength of the AP and satellite signals, to test the DUT's choice between positioning options, its switch over time, its sharing of data to improve time to locate and similar DUT responses to signals. The test controller 1311 can be used to coordinate the means for determining 1321 of the WiFi test with a GNSS simulator.

Thus, a rich variety of structures corresponding to the means for determining 1321 have been disclosed. These structures support the three WiFi test modes and related test modes that involve both WiFi and GNSS.

As disclosed in the context of FIG. 4 and elsewhere, additional device blocks include attenuators 1341 and combiners or mixers 1351. The mixed signal is coupled from the mixer 1351 to the DUT 225.

These operative blocks can be used with means for supplying location database services 1361 in various combinations. Structures that implement this means may use either live forwarding to a commercial service 1371 or a synthetic database that locally emulates a live service. Some DUTs rely on a location database service either to resolve a location from observations relayed to the service or to supply AP location data from which the DUT can resolve its location. When a communications channel is available, such as a WiFi channel or a cellular channel, the DUT communicates with the location database service.

The live forwarding structure 1371 of the means for supplying location database service includes a communications channel that the DUT can use to communicate with the live AP location database 231. As illustrated in FIG. 2, this channel can be an open WiFi channel that supports two way communications. As illustrated in FIG. 3, this channel alternatively could be a cellular data channel supported by a cellular network emulator. This means for supplying need not support both channel types. The WiFi or cellular channel allows the DUT to connect to the live location database, but neither the DUT tested nor the live location database that participates in the test is part of the means for supplying location database service, as disclosed herein.

The alternative synthetic AP location structure 1373 of the means for supplying location database services includes a communications channel that the DUT can use to communicate with a synthetic AP location database 231. The synthetic location database emulates a live AP location database and supports the same protocol(s) as the live AP location database. The synthetic location database may be maintained for test purposes without any necessary correlation to particular real world APs or to locations in a live AP location database. One way to prepare a synthetic database would be to download data from a live database and maintain selected data (optionally modified data) as part of the test device. Another option would be to provide a communications channel that the DUT can use to communicate with a synthetic AP location database maintained for test purposes by a vendor of live services. In some embodiments, neither the DUT tested nor the synthetic location database that participates in the test is part of the means for supplying location database service, as disclosed herein. In other embodiments, the means for supplying location database service includes the communications channel and the synthetic location database, being maintained as part of the test device.

Accordingly, alternative structures have been disclosed as means for supplying location database services.

Methods Perspective

Figure 12:
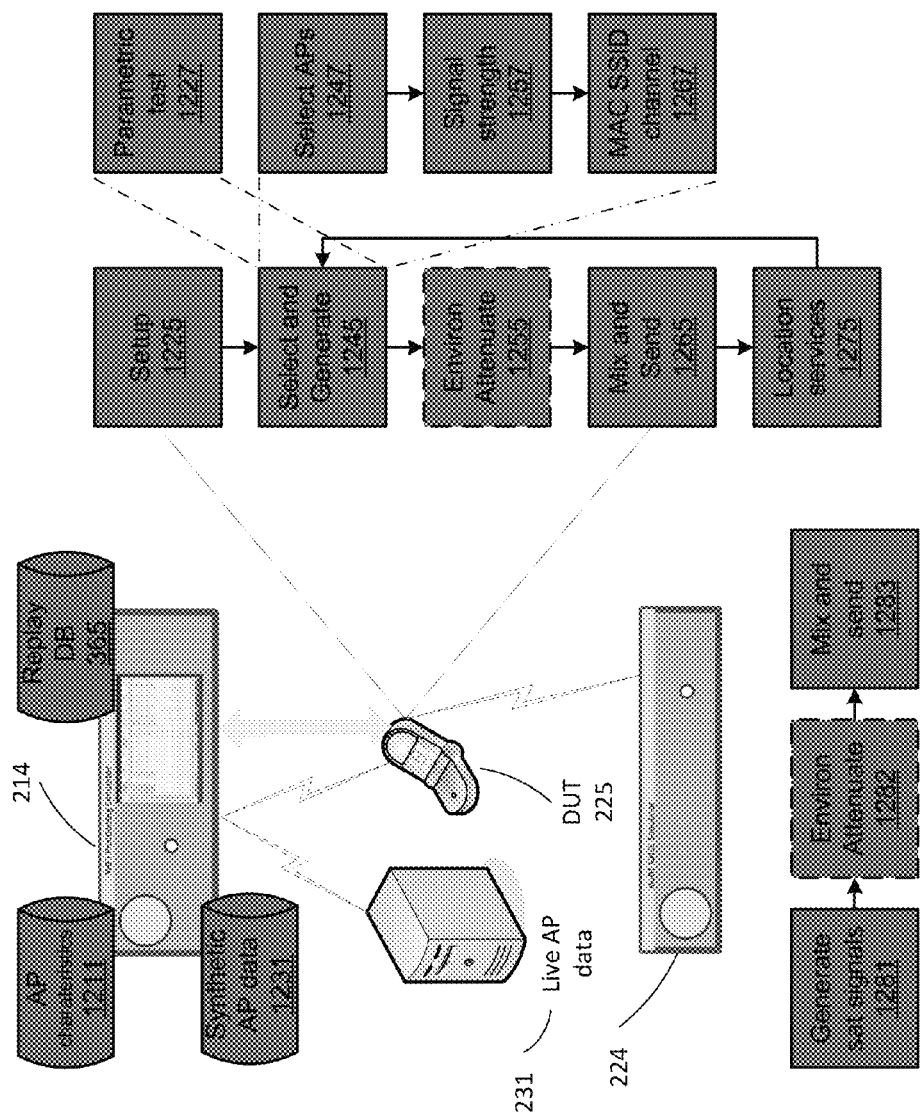
FIG. 12 illustrates actions that can be combined into a variety of methods.

FIG. 12 illustrates methods corresponding to the devices described above. It depicts actions that combine as a variety of methods.

Details of setup 1225 vary depending on the operating mode. Setup may include coupling the WiFi positioning simulator 214 and/or GNSS simulator 224 to the DUT 225. It also may include setting parameters for a test.

The select and generate action 1245 for the WiFi channels also depends on the mode of testing. Signals that emulate multiple APs are generated. In emulated mode, the AP characteristics 1221 selected for a parametric test 1227 are generated. In replay mode, parameters for the signal to generate are loaded from a replay database 365. In simulated drive mode, this action includes selecting the APs to generate 1247. Signal strengths at the simulated DUT location are calculated 1257 from AP characteristics with optional attenuation factors 1255 described above. The emulated AP characteristics 1211 include at least MAC address, SSID and channel number for each AP. An attenuator may be used to modify an emulated AP signal to match the calculated received signal strength of the individual APs, thereby simplifying power control of the AP emulators.

Optionally, environmental attenuation may be overlaid 1255 on the emulated signals. While the figure depicts this as if it were a separate action in a sequence, the same attenuator can be used to implement both the select and generate 1245 and the environmental attenuation 1255. Several types of environmental effects are described above, which may include transmitter drift, environmentally caused random fluctuations, and systematic impairments such as obstructions.

Mixers or combiners mix 1265 the signals that emulate the multiple APs. A large number of APs can be emulated on single wired or wireless connection.

Supplying location services 1275 to the DUT 225 can involve providing a communications channel to a live 231 or synthetic location database, typically maintained by a vendor. In some embodiments, the method further includes the test device responding from a serving up synthetic location database 1231 to location database service requests from the DUT.

In parallel with the WiFi positioning simulator 214, a GNSS simulator 224 can emulate satellite signals and provide them to the DUT 225. As described above, the test controller coordinates the two signal sources and, optionally, environmental attenuations. The method involves fewer steps for satellite signals than for WiFi signals, because there are fewer candidate sources to emulate—there are fewer satellites in orbit than there are APs in a square kilometer of a city! The method includes generating satellite signals 1281 and optionally attenuating 1282 them based on a simulated DUT location and simulated obstructions between the DUT and satellites, for instance in an urban canyon or indoors. Then, mix and send 1283 the signal to the DUT 225.

In one variation, WiFi and GNSS simulators are used to test the DUT's ability to provide continuous positioning, as the DUT's environment changes. For instance, as the DUT moves between indoors and outdoors or between an urban canyon and a street with lower buildings.

As one aspect of the methods that combine WiFi and GNSS signals, the location simulated or emulated by both positioning systems is synchronized by a signal sent to controllers for both signal generators.

A further aspect is of the methods is that the simulator generates beacon packets, compliant with an 802.11x standard. The beacon packets may be generated on a schedule or responsive to requests.

The methods further may include directional attenuation that takes into account phone orientation, phone position in a vehicle and/or body proximity. This may be implemented using a look up table or sectored parameters.

The number of candidate APs from which APs to emulate are evaluated may be twice, three times, four times, five times or a larger factor of the number of APs being emulated.

As an alternative to combining WiFi positioning with GNSS positioning, it may be combined with AFLT, cell-id or enhanced cell-id positioning emulators. A network simulator for CDMA may include circuitry and software to generate AFLT data for approximate positioning. A network simulator for any network may provide cell id data.

When an internal engine 463 broadcasts data during a test, it may stream time stamped data with information such as simulated DUT location and emulated AP characteristics. It further may stream the same data used to derive generator parameters and/or data used to drive the generators.

In ULTS systems (UMTS—Universal Mobile Telecommunications System—Location Test Systems) that emulate UMTS data protocol of a cellular network or in systems that emulate LTE cellular networks, the method and test devices may support Secure User Plane Location ("SUPL") transmission of data. As an improvement on use of SUPL with UMTS or LTE data over cellular channels, the SUPL protocol could be implemented over WiFi channels.

Articles of Manufacture

One article of manufacture that follows from the disclosure above is a machine readable, non-transitory memory that includes program instructs which, when executed by an electronic device, carry out any of the methods described above. (By "non-transitory," we mean merely to exclude signals in transit on wires.)

Another article of manufacture is a machine readable, non-transitory memory that includes program instructs which, when combined with suitable electronic components, creates any of the devices described above.

We claim as follows:

1. A method of testing WiFi location circuitry and software of a mobile device under test (DUT), the method including:
   coupling a test device in communication with the DUT;
   generating and mixing signals that emulate at least ten WiFi access points (APs) visible from a simulated DUT location at test times during a test;
   wherein the emulated signal from each AP is characterized by at least a unique access point address, an access point identifier, a channel number, and signal strength that are reproducible by a test time reference;
   sending the mixed signals from the test device to the DUT.

2. The method of claim 1, further including systematically varying the number of APs and the signal strengths of the APs emulated for test times during the test.

3. The method of claim 1, further including:
   selecting a simulated location sequence for a simulated location of the DUT during a test;
   generating the emulated signals based on emulated AP locations proximate to the simulated DUT locations, including for the test times during the test;
   accessing an AP location database;
   selecting a plurality of AP locations proximate to the simulated DUT location;
   for each selected AP location:
     calculating signal strength to emulate using at least the selected AP location and the simulated DUT location; and
     using at least the unique access point address, the access point identifier, and channel number information from the database to generate the emulated signals.

4. The method of claim 1, further including:
   generating the emulated signals based on received signals at the simulated DUT location, including retrieving from a test drive replay data set, for the simulated DUT locations, characteristics of the received signals to be replayed by the emulated APs;
   wherein the characteristics of the emulated APs include at least signal strength, unique access point address, access point identifier, and channel number.

5. The method of claim 1, wherein the replay data set includes AP characteristics derived from war-driving and recording real world APs observed during the war-driving.

6. The method of claim 1, further including:
coupling the emulated open access point to a network that provides access to a live AP location database that correlates DUT location information with reported locations of APs and characteristics of the APs including at least a unique access point address, access point identifier, and channel number and regularly updates the reported locations and characteristics of real world APs; and
forwarding messages between the DUT and the live AP location database.

7. The method of claim 6, further including emulating synthetic APs for APs moving in vehicles, for which location data is not available in an AP location database.

8. The method of claim 6, further including emulating APs at locations that are different from location data posted in an AP location database.

9. The method of claim 1, further including:
coupling the emulated open access point to a synthetic AP location database that correlates DUT location information with locations of APs and characteristics of the APs including at least unique access point address, access point identifier, and channel number;
wherein synthetic AP location database is maintained for test purposes without any necessary correlation to particular real world APs and the synthetic AP location database emulates a protocol used to connect with a live AP location database.

10. The method of claim 1, further including applying sectored attenuation of power received from the AP, wherein obstructions or antenna arrangements are accounted for by directionally sectored attenuation parameters.

11. The method of claim 1, further including emulating attenuation due to characteristics of a local environment within 20 feet or less of DUT.

12. The method of claim 1, applied to co-testing of WiFi and GNSS capabilities, the method further including generating, mixing and feeding to DUT emulated GNSS signals for the simulated DUT location at the test times during the test.

13. A test device that tests WiFi location circuitry and software of a mobile device under test (DUT), the device including:
one or more signal generators and attenuators adapted to emulate at least ten WiFi access points (APs) visible from a simulated DUT location at times during a test;
means for determining characteristics of emulated signals of each AP at specific times during the test, including determining a unique access point address, an access point identifier, channel number and signal strength for a particular AP, wherein the means for determining is coupled to the signal generators;
a mixer that mixes the emulated signals of each AP for transmission to the DUT, coupled to the signal generators.

14. The device of claim 13, wherein the means for determining includes:
an interface that accepts user entry of AP characteristics and of one or more test ranges of the characteristics to be emulated at times during the test;
and an emulation controller that varies AP characteristics during the test according to the test ranges.

15. The device of claim 14, wherein the emulation controller systematically varies the number of APs, the channel numbers used, and the signal strengths of the APs emulated through the test ranges.

16. The device of claim 13, wherein the means for determining includes:
a database that stores data for replay to the DUT at a plurality of simulated locations in a simulated location sequence, the data for replay including a plurality of APs visible at a particular location and, for each AP, at least unique access point address, an access point identifier, channel number, and received signal strength; and
a replay controller that feeds at least some of the data for replay to the signal generators at the times during the test.

17. The device of claim 13, further including:
a test controller, running on a processor and coupled to the means for determining characteristics of emulated APs, that supplies a simulated location sequence that represents one or more simulated locations of a DUT during a test;
wherein the means for determining includes:
a database that stores AP locations and AP characteristics, the characteristics including at least a unique access point address, an access point identifier, channel number and broadcast signal strength;
an AP selector that selects particular APs to emulate from APs visible to the DUT at a plurality of simulated locations in the simulated location sequence;
a received signal strength calculator that calculates received signal strength for signals from the selected APs based on at least the AP location, distance to the simulated location of the DUT, and the broadcast signal strength; and
an emulation controller that feeds the calculated received signal strength and the AP characteristics for the selected APs to the signal generators at times during the test.

18. The device of claim 13, further including:
at least one open AP among the emulated APs; and
means for supplying location database services to the DUT via the open AP.

19. The device of claim 18, wherein the means for supplying location database services includes:
access to a network that via which the DUT can access to a live AP location database that correlates DUT location information with reported locations of APs and characteristics of the APs including at least unique access point address, access point identifier, and channel number and regularly updates the reported locations and characteristics of real world APs; and
message forwarding between the DUT and the live AP location database.

20. The device of claim 18, wherein the means for supplying location database services includes:
a synthetic AP location database that correlates DUT location information with locations of APs and characteristics of the APs including at least unique access point address, access point identifier, and channel number;
wherein synthetic AP location database is maintained for test purposes without any necessary correlation to particular real world APs and the synthetic AP location database emulates a protocol used to connect with a live AP location database.

21. The device of claim 13, further including:

at least one attenuator;

directional AP signal strength attenuation data in memory accessible to the means for determining;

wherein the attenuator attenuates the generated signal corresponding to at least a direction from a particular AP to the simulated DUT location and the directional AP signal strength attenuation data.

\* \* \* \* \*